June 22, 1965  F. S. SILLARS  3,190,528
APPARATUS FOR SOLDERING CANS
Filed Oct. 17, 1961  4 Sheets-Sheet 2
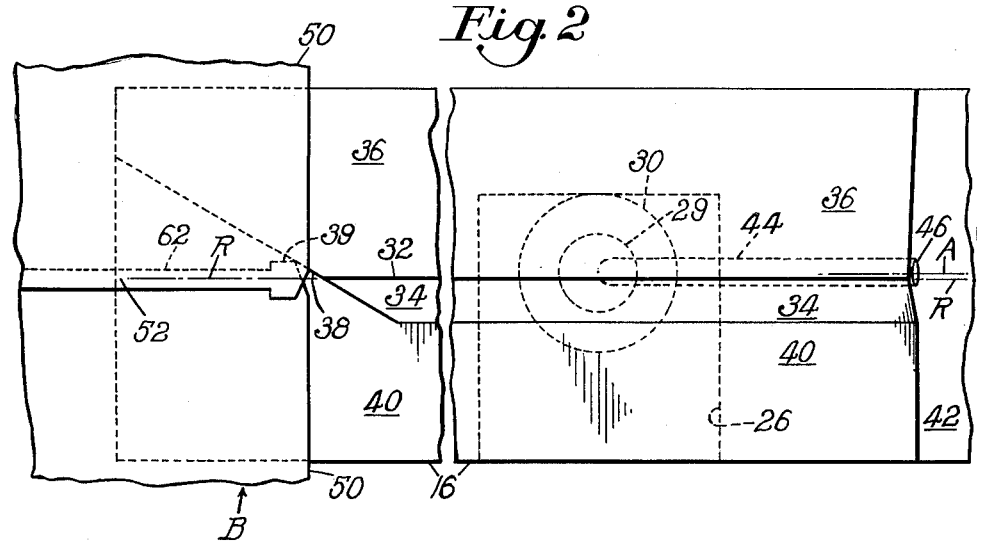
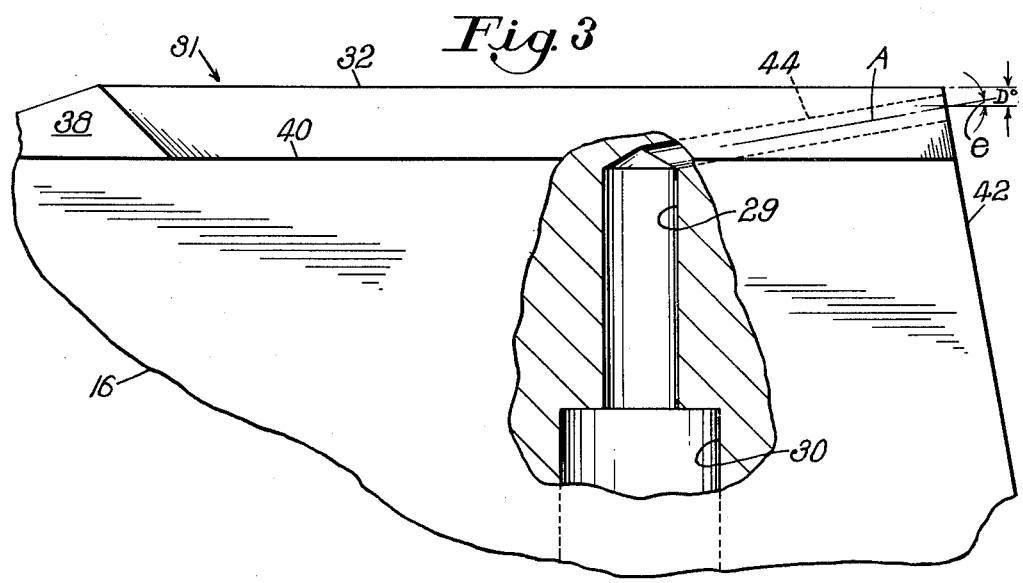
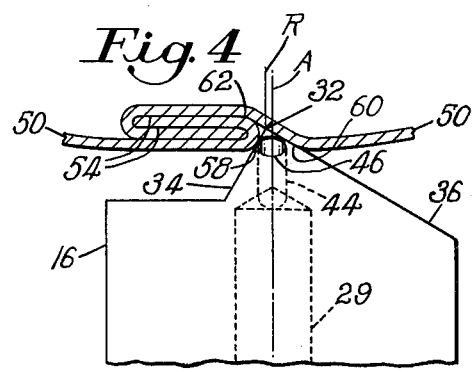

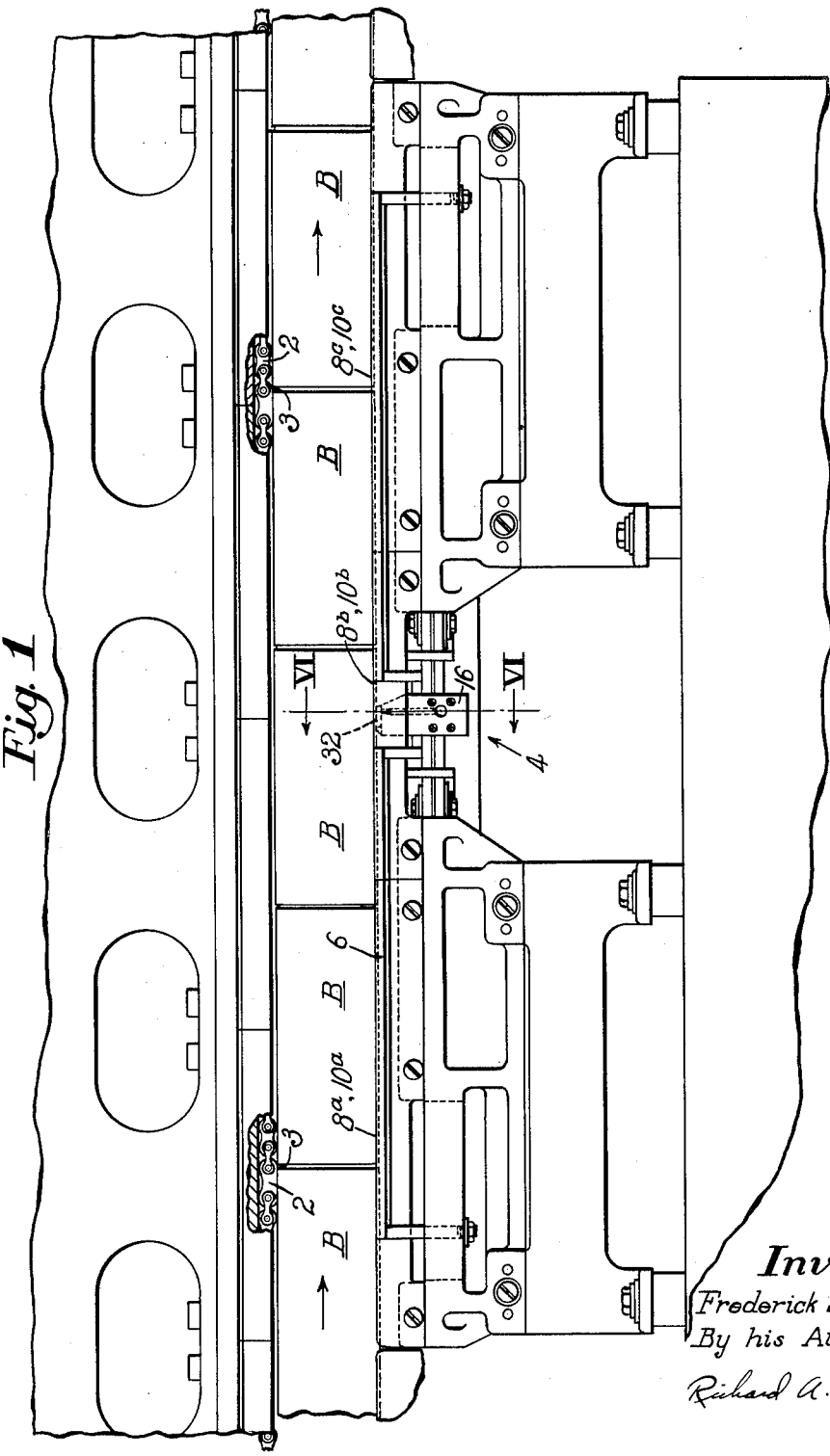

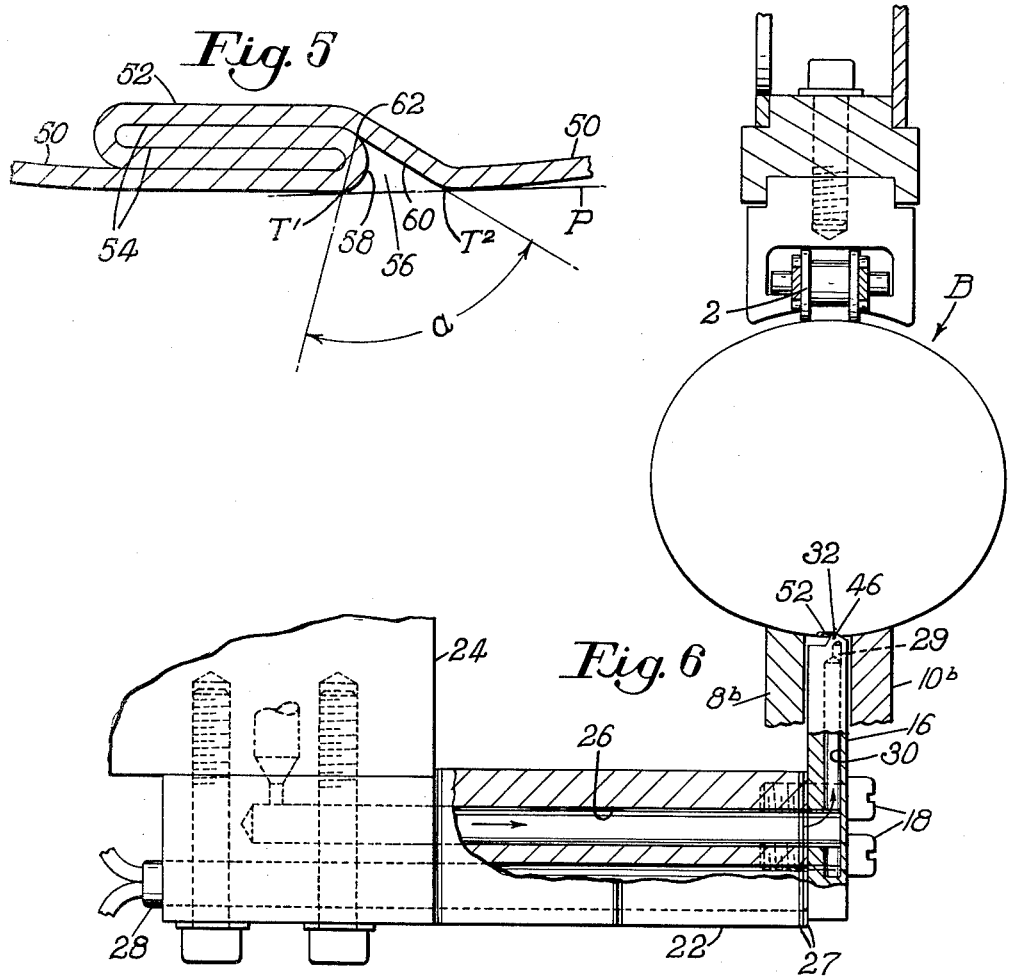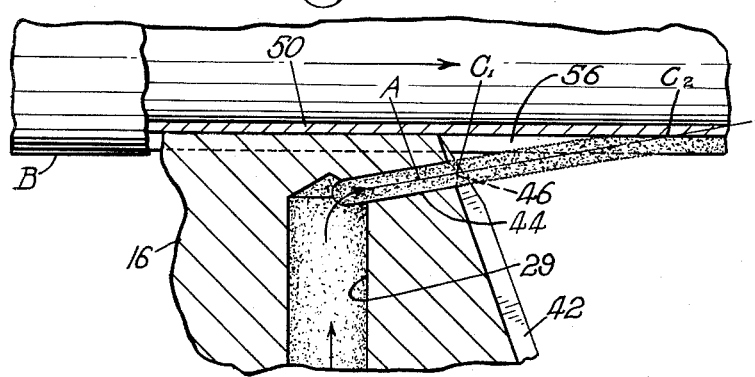

June 22, 1965  F. S. SILLARS  3,190,528
APPARATUS FOR SOLDERING CANS
Filed Oct. 17, 1961  4 Sheets-Sheet 4

3,190,528
APPARATUS FOR SOLDERING CANS
Frederick S. Sillars, Beverly, Mass., assignor, by mesne assignments, to Campbell Soup Company, Camden, N.J., a corporation of New Jersey
Filed Oct. 17, 1961, Ser. No. 145,550
15 Claims. (Cl. 228—43)

This invention relates to apparatus for soldering can bodies and more particularly to an applicator or nozzle for applying solder to the side seams of "tin" cans as they come from a bodymaker. The conventional method of forming a "tin" can body is to bend a sheet of metal into a tube and interlock its edges to form a side seam or longitudinal seam joint of interlocked layers. It is to these layers that solder must be applied to seal the joint.

From the outside of the can the body material adjacent the interlocked layers turns inwardly forming a narrow re-entrant groove extending lengthwise of the body. As pointed out in my United States Patent No. 3,000,338 which issued September 19, 1961, a conventional method of soldering side seams is by applying the solder to a band overlying the side seam and extending a substantial distance on both sides of the groove and then removing as much of the excess solder as possible. However, the quantity of solder remaining on the cans is two or three times the amount necessary to accomplish the intended job of sealing the interlocked layers. This method is usually accomplished by the use of transfer rolls which lift molten solder from a trough or reservoir and roll it into engagement with the can bodies in an area bridging the seam groove. These rolls are susceptible to picking up and transferring to the can foreign matter in the form of oxides in the solder. Furthermore, the rolls having considerable mass compared with the cans, often convey excessive heat to the side seams which results in slow cooling and poor quality soldering.

Still another method of soldering resides in projecting a liberal quantity, wide diameter jet of molten solder into space and directing the jet against the can. In addition to requiring excess solder to be removed, this method also has additional disadvantages, one being the difficulty of maintaining the trajectory of solder with respect to the can bodies to assure that the solder always strikes the can but only in the area where it is needed. This method also is inclined to direct solder upwardly into the inside surfaces of the can bodies as the open ends of the can body pass through the jet, whereby the solder can solidify as loosely attached beads and become harmful to the contents of the can. Furthermore, by projecting a jet of solder into space, opportunity is provided for the solder to oxidize before it strikes the cans' surfaces which is obviously an undesirable condition.

It is an object of this invention to provide means for depositing a predetermined quantity of solder in the seam groove of a can body with no more solder being applied than is necessary to seal the seam joint.

Another object is to provide means for applying solder to the side seams of can bodies without introducing oxides and other impurities.

Still another object is to provide means for soldering the side seams of can bodies without splashing solder or causing it to accumulate on the cans where it must subsequently be removed or where it could contaminate the contents of the cans.

In my above-identified patent there is disclosed a curved resilient needle for applying solder to grooved side seams of moving can bodies. The bodies are conveyed along an internal mandrel with their side seams in substantial alignment. The needle resiliently engages the seams and discharges solder directly into the seam grooves. Contact between the needle and the indented seam is maintained by pressure forcibly urging the needle into contact with the can and by the inherent resiliency of the needle which permits it to "follow" the groove.

In a copending application of mine, Serial No. 794,422, filed February 19, 1959, (now U.S. Patent No. 3,056,368) there is disclosed apparatus for soldering can bodies comprising conveyor means for moving the bodies lengthwise of a track and means having members engageable with the can to impart pressure thereto during and after the time solder is applied. This apparatus does not employ an internal mandrel for guiding the cans but rather the conveyor and pressure means in cooperation with guide rails, move the can bodies in the desired path. With this apparatus the bodies are relatively free to flex and to conform to the solder applying member. With the mandrel type apparatus, on the other hand, the possible amount of flexure or body yieldability is somewhat less.

It is another object of this invention to provide a solder applicator or nozzle for machines that are equipped with or without a guiding mandrel.

It is still another object of this invention to provide a solder applicator or nozzle for directing a predetermined quantity of solder directly to the side seams of moving can bodies regardless of by what means they are moved.

In accordance with these objects and as a feature of this invention, there is provided an applicator or nozzle for applying solder to the side seams of moving can bodies each of which has a seam joint including a re-entrant groove. The nozzle comprises a rigid body which is adjustably mounted in the machine for alignment with the path of movement of the can bodies. The nozzle has an upstanding seam guide in the form of an upstanding, substantially horizontal, ridge shaped to enter and engage the re-entrant groove of the moving can bodies to guide them in a linear path. The nozzle has a solder discharging passageway oriented to direct solder into the groove substantially in the direction of the linear movement of the bodies. Camming means are provided on the nozzle for contacting the moving can bodies and deflecting the side seams into aligned relationship with the seam guide and the discharging passageway.

In order to apply solder more efficiently to the re-entrant grooves of the side seams, applicant has found that the diameter of the solder discharging orifice must be held within certain predetermined values. In order to project the solder more efficiently to the apex of the groove the discharging passageway is oriented relative to the guide in an established angular relationship. It is also displaced and deflected transversely of the guide an amount which is proportionate to its elevation in order to project the solder directly at the apex of the groove. The specific dimensions, orientations, and relationships of the passageway, its orifice and the seam guide will be described in more detail hereinafter.

The above and other features of the invention including various novel details of construction and combinations of parts will now be more particularly described with reference to the accompanying drawings and pointed out in the claims. It will be understood that the particular embodiments of the invention are shown by way of illustration only and not as limitations of the invention. The principles and features of this invention may be employed in varied and numerous embodiments without departing from the scope of the invention.

In the drawings,

FIG. 1 is a side elevation of a can body soldering machine embodying the invention;

FIG. 2 is a plan view on enlarged scale of a solder applicator embodying the invention and showing a portion of a can body engaging the applicator;

FIG. 3 is a side elevation, partly in section, of the applicator shown in FIG. 2;

FIG. 4 is a front end view of the applicator shown in FIG. 2 with a portion of a can body shown in section in engagement with the applicator;

FIG. 5 is a sectional view of a representative ideal interlocking side seam of a tin can;

FIG. 6 is a sectional view on enlarged scale taken on the line VI—VI of FIG. 1;

FIG. 7 is a sectional view of an applicator applying solder to a can body; and,

Figure 8:
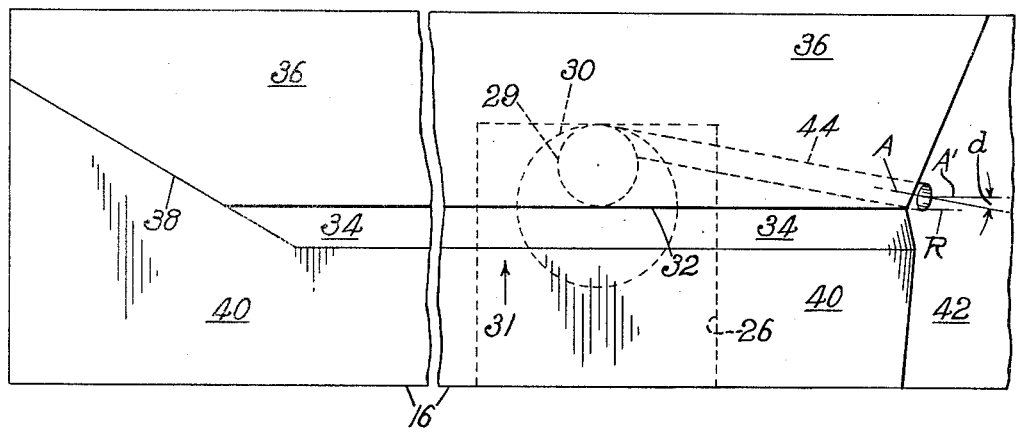
FIGS. 8, 9 and 10 are views similar to FIGS. 2, 3 and 4, respectively, of another form of solder applicator embodying the invention.

FIG. 1 shows can bodies B which were formed in a bodymaker of any conventional type, not illustrated, being conveyed from left to right in a timed and spaced order by a machine having an endless chain 2 with feed dogs 3 located at predetermined spaced intervals. Each dog is engageable with the trailing edge of one can body, the spaces between adjacent bodies being equal to the length of the dogs. The bodies are conveyed past a soldering station 4 which forms the subject matter of this invention. Prior to reaching the soldering station the can bodies are heated by any convenient means, as for example, by an induction heater 6 which forms no part of this invention. The bodies are supported on spaced, parallel guide rails extending horizontally lengthwise of the machine including metallic portions 8a, 10a, 8c and 10c on either side of the soldering station 4 and ceramic portions 8b and 10b at the station. The bodies are slightly compressed between the upper surfaces of the guide portions 8b and 10b and the conveyor chain 2, as shown in FIG. 6, and since there is no internal mandrel present, the bodies are free to yield and flex slightly as they pass the soldering station 4 as will be explained in more detail hereinafter.

The soldering station 4 includes a non-yieldable, rigid body solder applicator or nozzle 16 which is secured by screws 18 (FIG. 6) to an arm 22 extending from the bottom of a solder reservoir 24. The reservoir includes adjusting means, not shown, for controlling the height of molten solder and means for continuously feeding bars of solder to the reservoir whereby the pressure head of molten solder at the applicator 16 is maintained at a desired amount within close tolerances. Solder flows from the reservoir through the arm 22 in a horizontal passageway 26 which is maintained at a constant, predetermined temperature by a resistance heater 28. Horizontal adjustment of the applicator 16 is obtained by the use of shims 27 between the applicator 16 and the arm 22. The reservoir 24, the arm 22 and their adjusting means, are identical to those shown in my above-identified patent to which reference may be had for a more complete description of these elements.

The solder applicator 16 is a rigid body of ceramic or metal, and includes a vertical two diameter passageway 29 the lower or larger end 30 of which, as seen in FIG. 6, communicates with the passageway 26. The upper portion of the applicator includes an angular seam engaging guide 31 (best seen in FIGS. 2–4) having a ridge or crest 32 formed by sloping side surfaces 34 and 36 which project from a horizontal surface 40. The surface 34 is formed at an angle of 120° with the surface 40 and the surface 36, if 40 were projected, would form an angle of 150°. Therefore, the included angle between the surfaces 34 and 36 is 90° with the surface 36 sloping downwardly from the horizontal at 30° and surface 34 at 60°. The guide is thus sloped and oriented to enter the grooves of the side seams of the traveling can bodies to guide them, as shown in FIG. 4, and as explained in more detail hereinafter.

The ridge 32 of the guide is substantially horizontal when the applicator 16 is mounted as shown in FIGS. 1 and 6, although, it may be mounted inclined slightly upwardly or downwardly from the horizontal. The left-hand portion of the applicator includes a camming surface 38 intersecting the surfaces 34 and 36, as well as the horizontal surface 40, from which the guide 31 projects. The purpose and use of the camming surface 38 will be described in more detail hereinafter. On the right-hand side of the applicator 16, as seen in FIGS. 2 and 3, is a sloping surface or face 42 formed at 10° to the vertical and which intersects the surfaces 34 and 36 of the guide. A passageway 44 leading from the bore 30 intersects the surface 42, the intersection forming a circular solder discharging orifice 46. Specific details of the size and orientation of the passageway 44 and the orifice 46 will be described hereinafter.

A representative example of an ideal side interlocking seam of a "tin" can is shown in FIG. 5 on a scale of approximately 20 to 1. While side seams vary somewhat one from another depending upon their accuracy of manufacture, the representative seam, shown in FIG. 5, reflects the ideal interlocked seam of the entire range of can sizes from the smallest 2" mushroom can through gallon size. The seams do not vary substantially with the size of the can. The edges of the can body material 50 are interlocked as shown at 52, to form a side seam or seam joint comprising four superposed layers with almost imperceptible gaps 54 between layers. The best quality soldering occurs when solder flows through the gaps 54, to which flux has previously been applied to form a virtual film of solder in engagement with the layers of can material. The side seam also includes a longitudinal seam groove or identation 56 leading to the interlocked portion 52. The indentation 56 extends parallel to the axis of the can and is defined by a re-entrant angle $a$ located in the can body surface. The outer extent of the re-entrant groove or indentation, as it is also called, is defined by a line or plane P engaging the body material 50 on both sides of the groove at points of tangency $T_1$, $T_2$. The re-entrant groove includes side walls 58, 60 coming together at an apex 62 leading into the superposed and interlocked portion 52 of the seam. This representative ideal side seam has the following approximate dimensions: The distance between the points of tangency $T_1$, $T_2$, is in the order of magnitude of .05" and the depth of the groove from the line of tangency to the apex 62 is in the order of magnitude of .03". The re-entrant angle $a$, i.e. the angle between lines drawn from the apex 62 to the points of tangency $T_1$, $T_2$ is approximately 75°.

Lap seams, as well as the interlocked seam illustrated here, are usually constructed with re-entrant grooves. Because the illustrated side seam is representative of seams on the entire range of can sizes of both the lap and interlock types, and since even sizes above one gallon employ a seam of similar configuration, the principles of this invention pertain to virtually all cans regardless of their size and the gage of the material from which they are made.

Applicant has found that the closer the solder discharging orifice 46 is maintained to the walls 58, 60 and to the apex 62 of the re-entrant groove, the better the soldering results become. By positioning the orifice as close as possible to the walls and the apex, the length of the trajectory of solder between the orifice and the seam is reduced to a minimum. Applicant has found that the maximum acceptable or tolerable trajectory length, hereafter also referred to as $T_{max}$, is .9" and is controlling as to the design of the applicator 16. Solder trajectory is shown in FIG. 7 and is herein defined as the distance measured along the center of the trajectory from the center $C_1$ of the orifice 46, where it intersects the surface 42, to the point $C_2$ where the trajectory, if not otherwise prevented, would strike the re-entrant groove 56 of the side seam. It will be appreciated that the trajectory is not a straight line due to the effect of gravity but for purposes of illustration the line between the points $C_1$ and $C_2$ will be considered to be a linear extension of the axis A of the passageway 44. Beyond the maximum trajectory $T_{max}$ of .9" the molten solder begins to waiver and accuracy is lost. Furthermore, beyond this critical length the smooth stream of solder issuing from the orifice begins to become disassociated and strikes the target area somewhat spasmodically. A further reason for limiting the length of the trajectory is to reduce the exposure of the molten solder to air to a minimum thereby to reduce the chances of oxidation.

While the maximum solder trajectory $T_{max}$ is one of the over-all controlling factors in the design of a solder applicator made in accordance with this invention, another controlling factor is the permissible velocity of the solder discharged from the orifice. While it is acceptable under certain conditions to have a small amount of tightly adhered solder collected on the inner surface of a can body (due for example to the passage of fluxed solder through the seams in the lapped areas), where the cans are to be used for foods and the like it is a requirement that solder not be permitted to collect as loosely attached beads on the inner surface. This becomes even more critical in certain food cans which are internally lacquered and to which solder will not adhere. To assure that beading will not occur by solder being squirted or scooped up by the can bodies, the horizontal component of velocity $V_h$ of the solder must be of the same general order of magnitude as the velocity $V_c$ of the cans being soldered. It will be seen in FIG. 1, that while the can bodies B are relatively close to each other, small gaps exist between the trailing edge of one can body and the leading edge of the following body and therefore there is a short period of time when gaps between the cans are passing above the orifice 46 in the applicator 16. If the horizontal component of velocity $V_h$ of the solder is substantially greater than the velocity $V_c$ of the cans and the solder is directed high enough it could squirt through the gap and collect on the inside of the can body B which has just passed the applicator 16. Similarly, if the horizontal component of velocity $V_h$ of the solder is substantially less than the velocity $V_c$ of the cans and the solder is directed high enough it could be scooped up by the leading edge of a can body as it passes over the applicator. Since the solder itself is not fluxed, in either velocity condition, it is possible to collect as loosely attached beads on the inner surface of the can bodies.

The re-entrant grooves of the bodies B are fluxed prior to their reaching the applicator 16; therefore, capillary action exists which tends to draw the solder into the seams and the gaps 54. This capillary action causes the solder stream to break between can bodies, a portion of it being drawn forward by the seam of the leading can and the remaining portion being drawn by the seam of the next succeeding can passing the applicator. If the horizontal component of velocity $V_h$ of the solder is substantially the same as the velocity $V_c$ of the cans the solder cannot squirt into the open trailing end of one can body since to do this the solder must travel faster than the can. Likewise, under equal velocity conditions, the solder cannot be scooped up by the open leading end of the next can body since to do this the can would have to travel faster than the solder. Squirting or scooping will only occur when $V_h$ does not equal $V_c$ and then only if the vertical component of force of the solder stream is great enough to overcome the capillary force drawing the solder into the seams. Thus, if the vertical component of force will not overcome the capillary action, i.e. if the force is not enough to cause the solder to squirt through the gaps between cans, and if the solder is fully drawn by capillary action into the fluxed seams of the leading and trailing bodies, then the horizontal component of velocity $V_h$ of the solder need not be the same as the velocity $V_c$ of the cans. Thus, velocity inequality may occur but only if capillary forces are not overcome.

Since applicant's solder applying mechanism is designed to produce the most efficiently soldered cans by using a minimum amount of solder, the volumetric rate of solder discharge must be controlled. This is done by controlling the rate of flow or velocity of the solder trajectory from an orifice of known diameter, velocity being a function of height of solder in the reservoir. For example, when 200 cans per minute with good quality seams (i.e. seams approaching the ideal condition of FIG. 5) are being soldered, a relatively small orifice and low rate of flow are most desirable. However, when, for example, 800 cans per minute are being soldered or where the unsoldered seams are loosely constructed, a somewhat larger orifice may be employed at a greater rate of flow since the solder velocity must be of the order of magnitude of the velocity of the cans being soldered for the reasons stated above.

The upper limit of orifice diameter is determined by the breadth of the re-entrant groove which, as has been pointed out with reference to FIG. 5, is approximately .05". For the purposes of maintaining accuracy and to discharge solder as near to the apex 62 as possible without applying it outside the re-entrant groove 56, this orifice should preferably be no larger than the width of the groove, i.e., .05". The rate of flow of the solder is determined by the height of molten solder in the reservoir 24 which is preset and then automatically controlled by mechanism described in my above-mentioned patent.

Further factors to be considered in applying solder to the side seams are that while the solder trajectory cannot be permitted to attain a height whereby it could overcome the capillary forces and be scooped up by the traveling can bodies and soldify as loosely attached beads in the inner surface of the cans the trajectory must attain height sufficiently above the discharge orifice 46 to touch the side walls 58, 60 of the groove so that the solder may be drawn by capillary action into the gaps 54 between the superposed layers 52 of the seam. To accomplish the desired result without providing a trajectory of excessive height, applicant has found that the elevation angle $e$ (FIG. 3) of the trajectory, which is the angle the axis A of the passageway 44 forms with the crest 32, should not exceed 30° when the can seams move horizontally and the crest is horizontal.

The solder applicator of FIGS. 2, 3 and 4 has its orifice 46 and passageway 44 constructed and located to produce ideal soldering conditions. With the applicator mounted and adjusted as shown in FIG. 6, the guide 31 lies within the re-entrant groove 56, as shown in FIG. 4, the 30° side surface 36 engaging the relatively straight inclined surface 60 of the groove while the 60° side surface 34 tangentially engages the more rounded surface 58 on the other side of the groove. The cans are gripped under pressure between the conveyor chain 2 and the rails 8 and 10. As seen in FIG. 6, the guide 31 of the applicator 16 projects upwardly between the rails. The seams of the moving can bodies will stay in engagement with the applicator 16 since the applicator is rigid and the cans are urged against the applicator and the guide rails 8 and 10 by the chain 2. The inherent yieldability of the can bodies permits them to flex a slight amount between the chain and the rails 8 and 10 in both vertical and horizontal directions whereby a body will accommodate itself to the applicator and the orifice will remain in constant relationship to the various portions of the side seam.

Applicant has found that as the can bodies B come from the bodymaker the paths of travel of their seams and consequently of a given reference point, such as the apex 62 of the re-entrant groove, will vary, from can to can, from a theoretical vertical plane within limits of approximately plus or minus .005", or within a total range of .01". In order to assist all the cans in "finding" or attaining the desired registration with respect to the applicator 16, as shown in FIG. 4, the aforementioned camming surface 38 is provided on the forward or leading end of the guide 31, i.e. the left-hand end as seen in FIG. 2. The camming surface 38 will be seen to be a vertical plane surface intersecting the sloping side surfaces 34 and 36 of the guide. The angle between the surfaces 38 and 36 is acute and the intersection of the surface 38 and the ridge or crest 32 is slightly rounded. By simple trial and error process, the mean position of the path of travel of the seam or a reference point, e.g. the apex 62 of the seams, is determined at the beginning of a run. The applicator 16 is then adjusted by the machine shims 27 or the like (FIG. 6) with the crest 32 located .005″ laterally of the mean path of the theoretical line on the surface 60 it ultimately is intended to engage in a direction to the left as viewed in FIG. 4 or downwardly as viewed in FIG. 2. The surface 38 is then in position to engage the edge of the outer side seam lap 39 (FIG. 2) which is located at the leading end of the can body B. The outer lap extends outwardly of the can body surface, and hence, is below the crest 32 of the guide. A more detailed description of the can body lap may be found in my above-mentioned application Serial No. 794,422, filed February 19, 1959, now Patent No. 3,056,368. Engagement of the edge of the lap 39 with the surface 38 causes the body to be deflected or rotated so that the crest 32 of the guide 31 becomes properly aligned with the re-entrant groove 56. Thereafter, the lap 39 becomes disengaged from the surface 38 since by this time the body B has moved over the steeper, downwardly sloping surface 34 of the guide and the can groove drops onto the crest 32 of the guide which takes over control of guiding the can.

As an example, a can body B which is approaching the applicator 16 with its seam located .005″ to the right of the mean path as viewed in FIG. 4, or above as viewed in FIG. 2, i.e. at one extreme of the range of predicated variations, will be moved or flexed .01″ into the desired relationship with the crest 32. A can which is approaching exactly along the mean path is cammed or flexed .005″ and finally a can which is approaching .005″ to the left or below the mean path, as viewed in FIG. 2, i.e. at the opposite extreme of the range of predicated variations, will arrive at the crest or ridge 32 in the desired alignment without having to be cammed.

The passageway 44 and, hence the orifice 46, in this illustrative example, has a diameter of .020″ producing a stream of solder of like diameter as shown in FIG. 7. The axis A of the passageway 44 has an elevation angle $e$ (FIG. 3) of 10° measured relatively to the crest 32. However this angle may be as small as 5° with smaller orifices. Minimum orifice size has been found to be .005″ which is the smallest orifice capable of producing acceptable flow considering hydraulic frictional engagement between solder and the wall of the passageway. The axis A of the passageway 44 lies in a vertical plane (see FIGS. 2 and 4) closely parallel to a vertical plane R passing through the ridge 32 of the guide 31. The passageway 44 is formed in the applicator 16 so that its orifice 46 is located virtually tangent to the surfaces 34, 36 (see FIG. 4) along the lines where they intersect the surface 42. The center of the orifice 46 does not lie directly below the crest 32 because the sides 34, 36 of the guide 31, while forming a 90° angle between them are formed at 60° and 30°, respectively, with the horizontal. As explained above, they are formed in this manner to facilitate entry into the can groove 56.

The distance $D_0$ (FIG. 3) from the center of the orifice to the crest 32 is approximately .015″. Consequently, the orifice discharges solder into almost direct tangential contact with the side walls 58, 60 of the side seam groove at approximately the same speed as the cans are traveling whereupon the solder is drawn immediately by capillary action uniformly to the apex 62 and into overlapping portions of the seam.

While the elevation angle $e$ of 10° directs the solder upwardly so that without a can present it will rise above the seam line, it does not rise with sufficient force to overcome capillarity and be scooped by the cans' leading edges and collected as loosely attached beads on their interior surfaces, which, as stated above, is to be avoided. The orifice 46, being located as close as it is physically possible to construct it to the surfaces 34 and 36 and to the ridge 32 and there being almost immediate contact between the stream of solder and the walls 58 and 60 of the side seam, the resultant trajectory or free flow of solder is extremely short and well within the limits applicant has found to be tolerable. With no can present the stream would rise above the line where the apex 62 would be since the stream is not directed tangent to that line but upwardly at the elevation angle $e$. With a can present, if the stream of solder for some reason did not touch the side walls 58 and 60 and rose directly to the apex 62, it would only attain a trajectory length of approximately .125″ which is considerably below the critical length of $T_{max}$ or .9″. Therefore, little opportunity for oxidation or wavering occurs.

While a solder applicator made in accordance with the example shown in FIGS. 2 to 4 produces the optimum soldering reuslts, practical manufacturing limitations may make it desirable to vary the design within certain limits hereinafter to be explained. Since the orifice 46 of the FIG. 2 nozzle is located as close as possible to the surfaces 34 and 36, it necessitates the applicator being made of extremely hard metal or ceramic, so that the walls will not wear away and expose larger portions of the passageway. Accordingly, it may become desirable to space the passageway 44 and, consequently, its orifice 46 a somewhat greater distance $D_0$ below the ridge 32 and hence away from the surfaces 34, 36.

Figure 9:
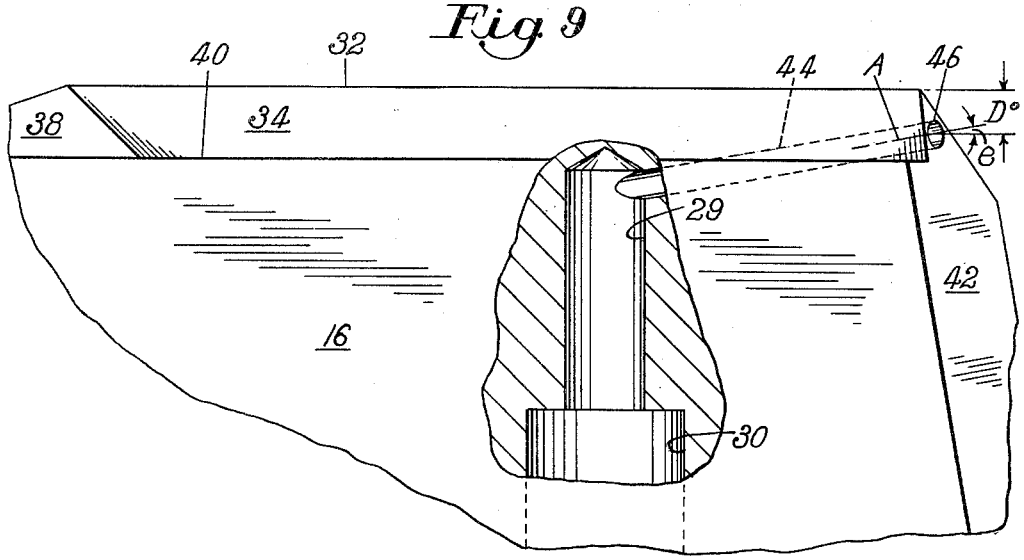
Figure 10:
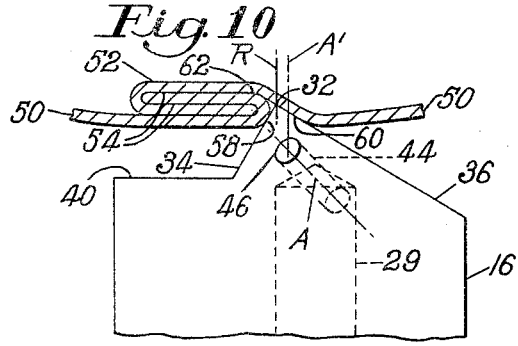

FIGS. 8, 9, and 10, show an applicator having a similar external size and configuration to that shown in FIGS. 2 to 4 but in which the distance $D_0$ is increased, i.e. the orifice 46 is lowered. Its orientation relative to the crest 32 of the guide is also changed to obtain the best compromise between an applicator producing the theoretical optimum soldering conditions and one which will still produce excellent results, is easy to manufacture, and will not wear excessively fast. The distance $D_0$ between the center of the orifice 46 and the crest 32 of the guide 31 is .03″. In addition to the orifice being lowered, the elevation angle $e$ may be increased to 20° although it is herein shown as 10° as in FIG. 3. The upwardly projecting solder stream strikes the target area both before it reaches the theoretical azimuth of its trajectory and long before the trajectory reaches $T_{max}$ or .9″ in length from the orifice.

Referring again to FIG. 4, the orifice 46 is located in the surface 42 virtually tangent to the surfaces 34 and 36 producing a trajectory which engages the substantially flat surface 60 of the groove at the same time it engages the curved surface 58 and, because of capillary attraction, results in a smooth uniform flow to the apex 62 and into the superposed layers 52. However, when the orifice is lowered from the crest 32 as in the applicator shown in FIGS. 8, 9 and 10, if the axis A of the passageway 44 remained unchanged, i.e. in a vertical plane parallel to the vertical plane R containing the crest 32 of the ridge, the upwardly projected solder would engage the curved surface 58 before it engaged the flat surface 60. The initial capillary attraction between the solder and the fluxed surface 58 would cause deflection of the stream toward the surface 58 before it engaged the surface 60 resulting in an uneven flow to the apex 62. In order to assure that the trajectory engages both sides at substantially the same time and further to cause it to project as nearly directly into the apex 62 as possible, the axis of the passageway 44 is deflected in a direction toward the apex 62 as shown in FIGS. 8 and 10.

At the same time, the center of the orifice is displaced toward the right as viewed in FIG. 10 to make it remain equidistant from the surfaces 34 and 36. Note that the distance between the plane R and the plane A′ which represents a plane parallel to the plane R passing through the axis A at the orifice is greater in the FIG. 10 nozzle than the distance between the plane R and the axis A in in FIG. 4 nozzle. With the orifice center .03" below the crest 32 and with an elevation angle $e$ of 10°, the optimum deflection angle $d$ has been found to be 10°. Thus, the actual trajectory is a compound angle having dimensions in both the horizontal and vertical directions.

Note too that the face 42 of the FIGS. 8–10 nozzle in addition to being inclined 10° to a vertical plane normal to the plane R is also inclined 10° to the plane R so that the passageway 44 interesects the face 42 forming a circular orifice 46 as it does in the FIGS. 2–4 nozzle. It follows, therefore, that the angular inclination of the face 42 to the vertical plane R is equal to the deflection angle $d$ and the inclination to a vertical plane normal to the plane R is equal to the elevation angle $e$, i.e., it is always normal to the axis A of the discharge passageway 44.

As in the FIG. 3 applicator, the solder will strike the surfaces 58, 60 and the apex 62 long before it reaches its critical trajectory length $T_{max}$. The length of solder trajectory produced by the applicator shown in FIG. 8 from the orifice 46 to the seam groove is .272".

The two over-all factors controlling the selection of the combinations of parameters are: (a) The maximum permissible solder trajectory length must not exceed $T_{max}$ which is .9". (b) The horizontal velocity $V_h$ of the solder stream must be substantially equal to the can velocity $V_c$ or may vary from it only when the capillary attractive force of the fluxed seam is not overcome by the upward component of force of the solder.

The area of the orfice 46 is selected so that when multiplied by the velocity of solder produces the quantity of solder needed to completely seal a seam without excess. The diameter may vary from .005" to a maximum of .05", the latter being equal to the width of the opening of a can seam measured between the points of tangency $T_1$ and $T_2$.

The distance $D_0$ which the center of the orifice may be spaced from the crest 32 of the applicator may vary from .0035" to .075". The minimum distance is limited by the diameter of the orifice 46 and the maximum distance by the maximum tolerable solder trajectory length $T_{max}$ multiplied by the sine of the elevation angle $e$.

The elevation angle $e$ therefore varies as a direct function of the distance $D_0$ and is limited by $T_{max}$. Applicant has found that the angle may vary from 5° to 30° but must satisfy the following conditions: The resultant upward vertical component of force of the trajectory, within normal variations in the velocity of solder being discharged must not cause the solder to overcome capillary forces and therefore be squirted into or scooped up and collected as beads on interior surfaces of a can. Furthermore, the angle must not be so small as to cause the solder to fall below the lowermost edge of the seam groove, whereby unsoldered gaps will occur.

The deflection angle $d$ varies as a direct function of both the distance $D_0$ and the elevation angle $e$ between limits of 0° to 20°.

Having thus described my invention, what I claim as new and desire to secure by Letters Patent of the United States is:

1. In a machine for applying solder to the side seams of moving can bodies each of which has a seam joint including a re-entrant groove, the combination of means for guiding the can for yielding movement along a predetermined path, nozzle comprising a rigid body having an upstanding inverted substantially V-shaped seam guide shaped to enter and engage the re-entrant groove to restrict movement of the can body to a linear path at the location where solder is applied, and a solder discharging passageway located at the terminal end of said seam guide measured in the direction of movement of said bodies and oriented to direct solder into the groove substantially in the direction of its linear movement.

2. In a machine for applying solder to the side seams of moving can bodies each of which has a seam joint including a re-entrant groove, the combination of means for guiding the cans for yielding movement along the predetermined path, nozzle comprising a rigid body having an upstanding inverted substantially V-shaped seam guide shaped to enter and engage the re-entrant groove to restrict movement of the can body to a linear path at the location where solder is applied, a solder discharging passageway located at the terminal end of said seam guide measured in the direction of movement of said bodies and oriented to direct solder into the groove substantially in the direction of its linear movement, and camming means contiguous with the guide at its leading end measured in the direction of movement of said bodies and engageable with the body as it contacts the nozzle for deflecting the side seam into aligned relationship with said guide and discharging passageway.

3. In a machine for applying solder to the side seams of moving can bodies each of which has a seam joint including a re-entrant groove, the combination of means for guiding the cans for yielding movement along a predetermined path, nozzle comprising a rigid body having at its top a seam guide in the form of an upstanding substantially horizontal inverted substantially V-shaped angular ridge shaped to enter and engage the re-entrant groove to restrict movement of the body to a linear path at the location where solder is applied, a solder discharging passageway in the nozzle extending generally in the direction of the angular ridge and terminating in a discharge orifice located at the terminal end of said seam guide measured in the direction of movement of said bodies, said passageway and orifice being oriented to direct solder into the groove substantially in the direction of its linear movement.

4. In a machine for applying solder to the side seams of moving can bodies each of which has a seam joint including a re-entrant groove, the combination of means for guiding the cans for yielding movement along a predetermined path, a nozzle comprising a rigid body having at its top a seam guide in the form of an upstanding substantially horizontal inverted substantially V-shaped angular ridge shaped to enter and engage the re-entrant groove to restrict movement of the body to a linear path at the location where solder is applied, a solder discharging passageway in the nozzle extending generally in the direction of the guide and terminating in a discharge orifice located at the terminal end of said seam guide measured in the direction of movement of said bodies, said passageway and orifice being oriented to direct solder into the groove substantially in the direction of its linear movement, and camming means at the end of the guide opposite the orifice comprising a surface on the nozzle intersecting said ridge and forming a camming member engageable with the body as it contacts the nozzle for deflecting the side seam into aligned relationship with said ridge and said orifice.

5. In a machine for applying solder to the side seams of moving can bodies each of which has a seam joint including a re-entrant groove, the combination of means for guiding the cans for yielding movement along a predetermined path, a nozzle comprising a rigid body having at its top a seam guide in the form of an upstanding substantially horizontal inverted substantially V-shaped angular ridge shaped to enter and engage the re-entrant groove to restrict movement of the body to a linear path at the location where solder is applied, a solder discharging passageway in the nozzle extending generally in the direction of the angular ridge and terminating in a discharge orifice located at the terminal end of said seam guide measured in the direction of movement of said bodies, said passageway and orifice being oriented to direct solder into the groove substantially in the direction of its linear movement, and camming means on the nozzle comprising a substantially vertical surface located at the end of the angular ridge opposite the orifice and intersecting the crest of the ridge at an acute angle, said surface being engageable with the body as it contacts the nozzle for deflecting the side seam into aligned relationship with said ridge and said orifice.

6. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped ridge shaped to enter and engage the re-entrant groove and guide the body in a linear path, a solder discharging passageway in the nozzle extending generally in the direction of the guide beneath its crest and terminating at one end thereof in an orifice having a diameter from .005" to .05".

7. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped angular ridge shaped to enter and engage the re-entrant groove and guide the body in a linear path, a solder discharging passageway in the nozzle extending generally in the direction of the guide beneath its crest and terminating at one end of the guide in a plane surface lying normal to the axis of said passageway and there forming a circular discharge orifice, said passageway and orifice being oriented to direct solder into the groove substantially in the direction of its linear movement.

8. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped angular ridge formed by two surfaces intersecting at a crest, said surfaces being inclined at 30° and 60°, respectively, to a vertical plane passing through their intersection to enter and engage the re-entrant groove and guide the body in a linear path, and a solder discharging passageway in the nozzle extending generally in the direction of the angular ridge beneath its crest and terminating in a discharge orifice, said passageway and orifice being oriented to direct solder into the groove substantially in the direction of its linear movement.

9. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped angular ridge formed by two surfaces intersecting at a crest, said surfaces being inclined at 30° and 60°, respectively, to a vertical plane passing through their intersection to enter and engage the re-entrant groove and guide the body in a linear path, and a solder discharging passageway in the nozzle extending generally in the direction of the angular ridge beneath its crest and terminating in a discharge orifice the center of which is spaced equidistant from said intersecting surfaces, said passageway and orifice being oriented to direct solder into the groove substantially in the direction of its linear movement.

10. A nozzle for applying solder to the side seams of moving can bodies each of which has a seam joint including a re-entrant groove, said nozzle having at its top a seam guide in the form of an upstanding substantially horizontal inverted substantially V-shaped ridge shaped to enter and engage the re-entrant groove and guide the body in a linear path, and a solder discharging passageway in the nozzle extending generally in the direction of the guide beneath its crest, said passageway being inclined upwardly relatively to the ridge at an angle of between 5° and 30° to direct solder into the groove.

11. A nozzle for applying solder to the side seams of moving can bodies each of which has a seam joint including a re-entrant groove, said nozzle having at its top a seam guide in the form of an upstanding substantially horizontal inverted substantially V-shaped ridge shaped to enter and engage the re-entrant groove and guide the body in a linear path, and a solder discharging passageway in the nozzle extending generally in the direction of the guide beneath its crest and terminating at one end thereof in an orifice the center of which is spaced from .0035" to .075" below the crest of the ridge.

12. A nozzle for applying solder to the side seams of moving can bodies each of which has a seam joint including a re-entrant groove, said nozzle having at its top a seam guide in the form of an upstanding substantially horizontal inverted substantially V-shaped ridge shaped to enter and engage the re-entrant groove and guide the body in a linear path, a solder discharging passageway in the nozzle extending generally in the direction of the guide beneath its crest and terminating at one end thereof in an orifice having a diameter from .005" to .05" the center of which is spaced from .0035" to .075" below the crest of the ridge.

13. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped ridge shaped to enter and engage the re-entrant groove and guide the body in a linear path, and a solder discharging passageway in the nozzle extending generally in the direction of the guide beneath its crest and oriented transversely thereof at an angle of between 0° and 20° to direct solder into said groove.

14. A nozzle for applying solder to the side seams of moving can bodies each of which has a seam joint including a re-entrant groove, said nozzle comprising a rigid body having at its top seam guide in the form of an upstanding substantially horizontal inverted substantially V-shaped ridge shaped to enter and engage the re-entrant groove and guide the body in a linear path, and a solder discharging passageway in the nozzle extending generally in the direction of the guide beneath its crest, said passageway being inclined upwardly relatively to the ridge at an angle of between 5° and 30° and oriented transversely thereof at an angle of between 0° and 20° to direct solder into said groove.

15. A nozzle for applying solder to the side seams of moving can bodies each of which has a seam joint including a re-entrant groove, said nozzle comprising a rigid body having at its top a seam guide in the form of an upstanding substantially horizontal inverted substantially V-shaped ridge shaped to enter and engage the re-entrant groove and guide the body in a linear path, and a solder discharging passageway in the nozzle extending generally in the direction of the guide beneath its crest, said passageway being oriented upwardly relatively to the ridge at an angle of between 5° and 30° and transversely thereof at an angle of between 0° and 20°, said passageway terminating at one end of the guide in an orifice having a diameter from .005" to .05" the center of which is spaced from .0035" to .075" below the crest of the ridge.

References Cited by the Examiner

UNITED STATES PATENTS

| | | | |
|---|---|---|---|
| 591,896 | 10/97 | Steegmuller | 113—93 |
| 2,469,392 | 5/49 | Jones et al. | 113—60 |
| 2,773,279 | 12/56 | Albright | 113—7 |
| 2,962,995 | 12/60 | Smith | 113—60 |
| 3,000,338 | 9/61 | Sillars | 113—60 |
| 3,053,212 | 9/62 | Flynn | 113—60 |

CHARLES W. LANHAM, *Primary Examiner.*

NEDWIN BERGER, *Examiner.*

UNITED STATES PATENT OFFICE
CERTIFICATE OF CORRECTION

Patent No. 3,190,528            June 22, 1965

Frederick S. Sillars

It is hereby certified that error appears in the above numbered patent requiring correction and that the said Letters Patent should read as corrected below.

Column 8, line 21, for "reuslts" read -- results --; column 9, line 66, and column 10, lines 5 and 23, after "path,", each occurrence, insert -- a --.

Signed and sealed this 21st day of December 1965.

(SEAL)
Attest:

ERNEST W. SWIDER            EDWARD J. BRENNER
Attesting Officer            Commissioner of Patents